(12) United States Patent
Pedersen et al.

(10) Patent No.: US 11,525,435 B2
(45) Date of Patent: Dec. 13, 2022

(54) WATER INTRUSION PREVENTION SYSTEM FOR TURBINE BLADES

(71) Applicant: PP Energy ApS, Nordborg (DK)

(72) Inventors: Jesper Ankjær Pedersen, Nordborg (DK); Peter Moos Junker, Nordborg (DK); Lars Martensen, Nordborg (DK)

(73) Assignee: PP Energy ApS, Nordborg (DK)

( * ) Notice: Subject to any disclaimer, the term of this patent is extended or adjusted under 35 U.S.C. 154(b) by 5 days.

(21) Appl. No.: 17/274,593

(22) PCT Filed: Sep. 12, 2019

(86) PCT No.: PCT/EP2019/074435
§ 371 (c)(1),
(2) Date: Mar. 9, 2021

(87) PCT Pub. No.: WO2020/058099
PCT Pub. Date: Mar. 26, 2020

(65) Prior Publication Data
US 2021/0270248 A1 Sep. 2, 2021

(51) Int. Cl.
*F03D 80/50* (2016.01)
*F03D 1/06* (2006.01)

(52) U.S. Cl.
CPC .............. *F03D 80/50* (2016.05); *F03D 1/06* (2013.01); *F05B 2230/80* (2013.01);
(Continued)

(58) Field of Classification Search
None
See application file for complete search history.

(56) References Cited

U.S. PATENT DOCUMENTS

| 3,121,470 A | 2/1964 | Stone et al. |
| 3,452,764 A * | 7/1969 | Bell .......................... B23K 9/32 |
| | | 135/900 |

(Continued)

FOREIGN PATENT DOCUMENTS

| DE | 19909698 A1 | 4/2000 |
| DE | 19909698 A1 * | 4/2000 ............ B66F 11/044 |

(Continued)

OTHER PUBLICATIONS

International Search Report for PCT Serial No. PCT/EP2019/074435 dated Dec. 17, 2019.

*Primary Examiner* — J. Todd Newton
*Assistant Examiner* — Brian O Peters
(74) *Attorney, Agent, or Firm* — McCormick, Paulding & Huber PLLC (57) ABSTRACT

The present invention relates to a water intrusion prevention system (1) mounting on a turbine blade (100) of a wind turbine. In order to exhibit excellent weather protection, the water intrusion prevention system (1) comprises a connecting means (10) adapted for removably fixing the water intrusion prevention system (1) on the turbine blade (100), further a collar sheet (20) disposed on the connecting means (10) and having a collar portion (22) extending away from the connecting means (10), the collar portion (22) constituting an upper collar sealing round about against an outer surface (101) of the turbine blade (100) if the water prevention system (1) is mounted on the turbine blade (100). In addition, the water intrusion prevention system (1) includes an umbrella sheet (30) disposed over the connecting means (10), the umbrella sheet (30) covering an upper side of the pressing means (10) and protruding laterally downwards away from the connecting means (10) round about the turbine blade (100) if the water prevention system (1) is (Continued)

mounted on the turbine blade (100). The umbrella sheet (30) sealingly adjoins the collar portion (22).

20 Claims, 4 Drawing Sheets

(52) U.S. Cl.
    CPC ....... *F05B 2240/14* (2013.01); *F05B 2240/57* (2013.01); *F05B 2260/30* (2013.01)

(56) References Cited

U.S. PATENT DOCUMENTS

| | | | |
|---|---|---|---|
| 3,991,583 A * | 11/1976 | Scurlock | B63C 11/00 405/193 |
| 5,038,889 A | 8/1991 | Jankowski | |
| 7,134,444 B2 | 11/2006 | Mintie et al. | |
| 8,033,791 B1 | 10/2011 | Watanabe | |
| 8,043,022 B2 | 10/2011 | Chau | |
| 8,062,431 B2 | 11/2011 | Kumar et al. | |
| 8,397,382 B2 | 3/2013 | Anasis et al. | |
| 8,500,403 B2 * | 8/2013 | Grabau | F03D 80/30 416/62 |
| 8,720,058 B2 * | 5/2014 | Anasis | B23P 6/002 29/889.1 |
| 9,447,601 B2 | 9/2016 | Maillis et al. | |
| 9,714,642 B2 | 7/2017 | Teichert | |
| 9,828,787 B1 * | 11/2017 | Thiessen | E04G 21/24 |
| 10,352,062 B2 | 7/2019 | Fletcher | |
| 10,718,317 B2 | 7/2020 | Jamuna | |
| 10,927,816 B2 | 2/2021 | Diget et al. | |
| 2006/0225960 A1 | 10/2006 | Ferlin et al. | |
| 2010/0129229 A1 * | 5/2010 | Grabau | F03D 80/30 29/889.1 |
| 2010/0132738 A1 | 6/2010 | Kumar et al. | |
| 2011/0024233 A1 | 2/2011 | Lott | |
| 2011/0167633 A1 * | 7/2011 | Anasis | B23P 6/002 29/889.1 |
| 2019/0136836 A1 | 5/2019 | Sanderson | |

FOREIGN PATENT DOCUMENTS

| | | | |
|---|---|---|---|
| DE | 101 18 906 A1 | 11/2002 | |
| DE | 20 2004 016 460 U1 | 12/2004 | |
| DE | 202004016460 U1 * | 1/2005 | ............. F03D 1/003 |
| DE | 20 2009 002 054 U1 | 6/2009 | |
| DE | 202009002054 U1 * | 7/2009 | ............. F03D 13/20 |
| DE | 102010011365 A1 | 9/2011 | |
| DE | 102010011365 A1 * | 9/2011 | ............. B66F 11/04 |
| EP | 0 906 483 | 4/1999 | |
| EP | 1 115 644 | 7/2001 | |
| EP | 2565440 A2 | 3/2013 | |
| EP | 2718561 A2 | 4/2014 | |
| EP | 2957538 A1 | 12/2015 | |
| EP | 3 438 375 A1 | 2/2019 | |
| EP | 3 538 797 B1 | 9/2020 | |
| GB | 2 283 046 A | 4/1995 | |
| GB | 2518701 A | 4/2015 | |
| GB | 2518701 A * | 4/2015 | ............. B23P 6/002 |
| NL | 1030193 C1 | 4/2007 | |
| WO | 97/48863 A1 | 4/1999 | |
| WO | 00/17086 A1 | 3/2000 | |
| WO | 2007033671 A1 | 3/2007 | |
| WO | WO-2007033671 A1 * | 3/2007 | ........... F03D 1/0658 |
| WO | 2012167788 A2 | 12/2012 | |
| WO | 2015/155507 A1 | 10/2015 | |
| WO | WO-2017194940 A1 * | 11/2017 | ........... B08B 15/026 |
| WO | 2018086655 A1 | 5/2018 | |
| WO | 2020/058099 A1 | 3/2020 | |
| WO | WO-2020156622 A1 * | 8/2020 | ......... E04B 1/34336 |

* cited by examiner

WATER INTRUSION PREVENTION SYSTEM FOR TURBINE BLADES

CROSS-REFERENCE TO RELATED APPLICATIONS

This application is a National Stage application of International Patent Application No. PCT/EP2019/074435, filed on Sep. 12, 2019, which claims priority to Danish Patent Application No. PA201800586 filed on Sep. 17, 2018, each of which is hereby incorporated by reference in its entirety.

TECHNICAL FIELD

The present invention relates to a water intrusion prevention system for protecting working platforms mounted on turbine blades against rain.

BACKGROUND

In recent years, wind turbines have grown significantly in size and the outer shape of the rotor blades has changed to a complex structure. Not only the thickness and the width change from the hub end to the tip end and from the leading edge to the trailing edge. The blade may also be pre-bent, angled, and/or twisted.

Wind turbine blades often need inspection, service, and maintenance. Furthermore, they may be upgraded, for example with a tip protection and/or a tip extension. In particular, the tip segment of the rotor blade is the part of the blade which is exposed to maximum speed and therefore has a particular need to be repaired or replaced.

However, technicians must be able to reach and work on the specific relevant sites of the mounted turbine blades. For this purpose, lifting devices are used on already mounted rotor blades as working platforms. For example, a lifting device has been proposed in EP 2 718 561 A2.

For maintenance, the relevant turbine blade to be maintained is positioned such that its tip points down to the ground. This means that said turbine blade is in a substantially vertical position (maintenance position). The lifting device with the working platform can be lifted up and down along the turbine blade.

Many inspection and repair measures have to be carried out in a protected environment. In particular, it is often necessary that the relevant areas are protected from rain. For some repair measures, even a special temperature range has to be ensured. Different habitat solutions have been developed in order to prevent working platforms of lifting devices from water. For example, technicians, their equipment and the maintenance areas may be sheltered from rain by tent that is pitched on the working platform.

As the turbine blades are typically very large and comprise a large surface, considerable amounts of rain and/or snow impinge on the surface in bad weather conditions. Typically, water flows down along an outer surface of the turbine blade being in the maintenance position with its tip pointing down to the ground. Especially if the working platform is positioned at a lower part of the turbine blade near to its tip, considerable amounts of water flowing down the blade impinge on the lifting device and on its working platform.

As noted above, wind turbine blades are often of a very sophisticated shape. Their shape of a turbine blade changes in a complex manner from its inner end mounted on the hub to its outer tip in order to achieve a low weight and optimal flow characteristics. Unfortunately, this complicates sealing between a water-protecting device that can be used at different vertical positions on the turbine blade being in the maintenance position and the turbine blade against ingress of water.

A working platform for wind turbine blades according to DE 10 2010 011 365 A1 comprises a rain cover. Two inflatable elements abutting directly on opposing side surfaces of a turbine blade are connected vie a detachable element connection like a zipper in such a way that a gap which would arise between said inflatable elements by introducing the turbine blade is almost completed.

A further closing accessory which is used in cases of rain to prevent water from entering a working platform is disclosed in EP 2 957 538 A1. The closing accessory comprises a laminar strip that is attached along a whole length of an elastic strip, which has suction pads along its length which can be fixed to a wind turbine blade. The laminar strip is attached to upper laminar elements covering the working platform by hook and loop attachment systems.

A further seal arrangement is disclosed in WO 2018/086655 A1.

However, with the known solutions, the sealing performance against the turbine blades is not yet sufficient, their structure is complex, they are not rugged enough or their handling is difficult.

SUMMARY

The object underlying the invention is to improve the protection against rain, hail and/or snow for working platforms for turbine blades.

This object is solved by a water intrusion prevention system according to claim 1.

The water intrusion prevention system is adapted for mounting on a turbine blade being in a maintenance position, wherein a central axis of the water intrusion prevention system is at least substantially parallel to a longitudinal axis of the turbine blade if the water intrusion prevention system is mounted on the turbine blade.

In particular, the water intrusion prevention system comprises:

A connecting means adapted for removably fixing the water intrusion prevention system on the turbine blade;

a collar sheet disposed on the connecting means and having a collar portion protruding away from the connecting means at least substantially parallel to the central axis such that the collar portion constitutes an upper collar surrounding the turbine blade round about and sealing round about against an outer surface of the turbine blade if the water prevention system is mounted on the turbine blade, the collar portion constituting an upper end part of the water intrusion prevention device along the central axis;

an umbrella sheet disposed over the connecting means, the umbrella sheet covering an upper side of the connecting means and protruding laterally downwards away from the connecting means if the water prevention system is mounted on the turbine blade;

wherein the umbrella sheet sealingly adjoins the collar portion.

In the maintenance position, a tip of the turbine blade constituting an outer end of the turbine blade opposite to an inner end mounted on a hub points down to the ground. Hence, a longitudinal direction of the turbine blade is at least substantially parallel to a vertical direction.

The connecting means is adapted to fix the water intrusion prevention system to the turbine blade on at least one site along the longitudinal direction of the turbine blade.

As the water intrusion prevention system can be removably fixed to the turbine blade, it is possible to mount and demount the water intrusion prevention system.

The connecting means may encompass at least a part of the turbine blade at a mounting site when the water intrusion prevention system is mounted on a mounting site. Preferably, the connecting means completely encompasses the turbine blade at the mounting site when the water intrusion prevention system is mounted there. Thus, the ruggedness and safety of the fixation is increased.

As noted above, if the water intrusion prevention system is mounted to the turbine blade, the collar portion seals round about against the outer surface. Water flowing down on the outer surface of the turbine blade is prevented from ingress between the collar portion and the surface of the turbine blade. Instead, the water approaching from above is deflected and it continues flowing down on an outside of the collar portion.

Then, the water reaches a region where the umbrella sheet adjoins the collar portion of the collar sheet. This region may constitute a lower end of the collar portion. As the umbrella sheet is adjoined to the collar portion in a sealed manner, the approaching water cannot penetrate between the collar sheet and the umbrella sheet. Hence, the water is guided to flow further away on an upper surface of the umbrella sheet.

As the umbrella sheet is disposed over the connecting means and covers the upper side of the connecting means if the water intrusion prevention system is mounted on the turbine blade, the umbrella sheet protects an area below it (in which the connecting means are located) from rain and water. Furthermore, as noted above, the umbrella sheet protrudes laterally downwards away from the connecting means round about the turbine blade. This means, that the umbrella sheet laterally projects away from the connecting means and hence from the turbine blade in a 360° range round about the central axis like an umbrella.

In other words, the upper collar and the umbrella sheet are configured to form a rain and water protection for a working area below them that completely surrounds the turbine blade if the water intrusion prevention system is mounted.

The water on the umbrella sheet flows down on the upper site thereof to an outer peripheral end of the umbrella sheet because the umbrella sheet protrudes not only laterally but also downwards. At least an outer part of the umbrella sheet protruding from the connecting means is slanted to guide the water to the outside due to gravity.

Even if considerable amounts of water flow down along the outer surface of the turbine blade, the water intrusion system ensures tight sealing against the outer surface in order to prevent ingress of water.

Using the separate collar sheet and the separate umbrella sheet, both sheets can be easily adapted to their specific functions. Furthermore, the handling of the system is facilitated.

In a preferred embodiment of the invention, an inclination of the upper surface of the outer part of the umbrella sheet lies within a range from 5° to 80° with respect to the vertical axis if the system is mounted, more preferably in a range from 15° to 45°. Hence, it is ensured that even large amounts of water flow off rapidly.

Preferably, the connecting means is adapted to fix the water intrusion prevention system at different sites along the vertical direction. In this case, the connecting means is configured to adapt to different shapes of the turbine blade at different sites. Additionally or alternatively, the water intrusion prevention system may comprise different connecting means that are adapted to different shapes of the turbine blade at different sites. In particular, the same water intrusion prevention system may be configured to be fixed to a first mounting site of the turbine blade or to at least a second mounting site of the turbine blade.

In a preferred embodiment of the present invention, at least an upper part of the upper collar surrounds the turbine blade in an at least substantially fittingly manner. This facilitates proper sealing between the upper collar and the turbine blade.

In another preferred embodiment of the present invention, at least the upper part of the collar portion can be made of a flexible and/or elastic material. Therefore, the upper part can adapt to the shape of the wind turbine blade at the mounting site more easily. More preferably, the whole collar portion or the whole collar sheet is made of a flexible and/or elastic material.

Preferably, the water intrusion prevention system further comprises a coat sheet disposed on the connecting means, the coat sheet protruding laterally downwards away from the connecting means below the umbrella sheet such that the coat sheet extends round about the turbine blade and that the umbrella sheet partly overlaps the coat sheet if the water prevention system is mounted on the turbine blade.

This means that the coat sheet protrudes farther away from the connecting means in the lateral direction than the umbrella sheet. In particular, the coat sheet may protrude farther away from the connecting means in the lateral direction than the umbrella sheet by at least 25%, more preferably by at least 60%, highly preferred by at least 100%.

This does not imply that an inner part of the coat sheet has to extend until the turbine blade. In contrast, due to the umbrella sheet, an inner end in a lateral direction perpendicular to the central axis can be spaced apart from the outer surface of the turbine blade. For example, the inner end can be mounted on the outer side of the connecting means, as noted below. However, a sufficient overlap between the umbrella sheet and the coat sheet is provided in order to prevent water from passing between the umbrella sheet and the coat sheet to the inner end of the coat sheet. In a cross section, the umbrella sheet partially overlaps the coat sheet in a manner similar to a tiled roof. With the additional coat sheet, the area protected from rain and water flowing down on the turbine blade can be further increased. In addition, the multi-part structure (separate coat sheet) facilitates the handling of the water intrusion prevention system. Furthermore, a range of an angle of inclination of the coat sheet can cover lower values than the one of the umbrella sheet. This is because the considerable amounts of water flowing down the turbine blade are already distributed to a larger area by the umbrella sheet above the coat sheet.

The rain impinging on the coat sheet and the water flowing to the coat sheet from the outer peripheral end of the umbrella sheet are further guided to the outside and downwards on an upper surface of the coat sheet.

The coat sheet may be made of flexible and/or elastic material. This facilitates the handling, in particular the assembly and disassembly. Furthermore, the ruggedness of the coat sheet can be increased in this manner.

According to an embodiment of the present invention, a fixing means is provided on the connecting means for attaching the coat sheet to the connecting means. This ensures a safe and reliable fixation of the coat sheet.

According to a preferred embodiment of the present invention, the fixing means is a rail provided on an outer side and/or a lower side of the connecting means for attaching the coat sheet to the connecting means. This ensures a safe and reliable fixation of the coat sheet.

An inner side of the connecting means is a side of the connecting means, which is adapted to face towards the outer surface of the turbine blade if the water intrusion prevention system is mounted on the turbine blade. An outer side of the connecting means is a side of the connecting means opposite to their inner side. A lower side of the connecting means is a side of the connecting means facing the ground if the water intrusion prevention system is mounted on the turbine blade. An upper side of the connecting means is their side opposite to their lower side if the water intrusion prevention system is mounted. The terms "inner side", "outer", "lower", and "upper" may be defined in the same manner for other elements if not defined in another way.

More preferably, the rail comprises a C-like cross-sectional shape and/or is made of aluminum or an aluminum alloy. Aluminum and aluminum alloys ensure good weather resistance and are light. The C-like cross-sectional shape exhibits good fixation performance and can be produced cost-efficiently.

According to an even more preferred embodiment of the present invention, the fixing means for attaching the coat sheet to the connection means is provided at the lower end of the connecting means. The fixing means may have a flexible, strong and lightweight form like for example a zipper, tie, lash, hook and loop fastener, shoe band form or any other easy fastener form.

In a more preferred embodiment of the invention, the coat sheet is removably fixed to the connecting means. This facilitates the handling, in particular the assembly, disassembly, and the transport even further.

More preferably, the coat sheet may be flexible and light enough to be attached to and/or detached from the connecting means by a single person. Most preferably, it is flexible and light enough to be handled by a single person even on a windy platform According to a preferred embodiment of the invention, the coat sheet has a higher strength than the umbrella sheet and/or is thicker than the umbrella sheet. In particular, the coat sheet may have a higher strength and/or thickness than both the umbrella sheet and the collar sheet. This is advantageous because the coat sheet covers a bigger area as the umbrella sheet. In particular, all the water impinging on the umbrella sheet is guided onto the coat sheet and additional rain, hail and/or snow may impinge on the coat sheet as well. If the coat sheet is less inclined than the umbrella sheet, the water is flowing off from the coat sheet more slowly and the coat sheet must bear more weight than the umbrella sheet.

Due to similar reasons, in a preferred embodiment of the present invention, the umbrella sheet has a higher strength than the collar sheet and/or is thicker than the collar sheet.

Preferably, a weighting means is disposed at an outer peripheral end region of the umbrella sheet for forcing down said outer peripheral end if the water intrusion prevention system is mounted on the turbine blade. The weighting means are forced down in the vertical direction by gravity when the system is mounted. Using the weighting means is a way to ensure that the umbrella sheet correctly protrudes laterally downwards or—in other words—that the umbrella sheet is correctly stretched.

In particular, the weighting means may force down the outer peripheral end of the umbrella sheet onto the upper surface of the coat sheet. This ensures that no rain, hail and/or snow can enter an area below the umbrella sheet through a vertical gap between the outer peripheral end region and the upper surface of the coat sheet. Furthermore, the weight of the weighting means lying on the coat sheet may further fix the coat sheet in case of bad weather conditions like storm. It is noted that the additional load applied to the coat sheet by the weighting means may be another reason for providing the coat sheet having a higher strength and/or thickness than the umbrella sheet.

According to a more preferred embodiment of the present invention, the weighting means comprises or consists of a weighting stripe and/or weighting cable. This is a simple way to ensure an even load distribution round about the outer peripheral end.

In another preferred embodiment of the invention, the connecting means is a clamp means comprising two clamp arms, the clamp arms being adapted to be mounted at both sides of the turbine blade for clamping the turbine blade in-between. Such a clamping means is easy to produce and easy to handle.

The clamping arms may be rigid. Alternatively, the may be flexible and configured to adapt to different shapes of different sites of the turbine blade.

More preferably, the two clamp arms are adapted to be fastened together for clamping the turbine blade in-between by means of at least two fastening means. For example, each of the fastening means may comprise at least one bolt.

In particular, the fastening means may be disposed at longitudinal ends of the two clamp arms in the lateral direction, which is at least substantially perpendicular to the central axis Most preferably, the clamp arms are wooden clamp arms. Additionally or alternatively, clamp arms made of metal and/or fiber-reinforced plastic may be provided.

Alternatively or additionally, the connecting means may comprise other suitable means for fixing the water intrusion prevention system to the turbine blade. For example, the connecting means may comprise vacuum means and/or a tie belt means. With the vacuum means, a vacuum can be applied between the outer surface of the turbine blade and the vacuum means such that the vacuum means are pressed against the outer surface of the turbine blade by an ambient pressure (the atmospheric pressure). The tie belt means may be tied around the turbine blade at the mounting site in order to encompass and gird the turbine blade for fixing the water intrusion prevention system to the turbine blade.

According to a further preferred embodiment of the present invention, the water intrusion prevention system further comprises a protection means which is located between the inner side of the connecting means and the outer surface of the turbine blade if the water intrusion prevention system is mounted on the turbine blade. The protection means may be disposed directly on the inner side of the connecting means, more preferably directly on an inner side of the clamping means, in particular on inner sides of the clamping arms. However, a part of the umbrella sheet and/or a part of the collar sheet may be located between the inner side of the connecting means and the outer surface of the turbine blade in this situation. The protection means protect the turbine blade from damages due to mounting and dismounting the water intrusion prevention system, in particular from damages caused by the connecting means.

More preferably, the blade protection means comprises a shock absorbent layer. Turbine blades often comprise fiber-reinforced plastics which are prone to damages caused by impact. The shock absorbent layer reduces the risk of such damages if the connecting means is moved onto the turbine blade too fast.

Most preferably, the shock absorbent layer comprises a neoprene layer. The shock absorbent layer may further comprise several neoprene layers. Neoprene exhibits good damping and is sufficiently rugged.

According to another aspect, the water intrusion prevention system preferably further comprises a head sealing means which is adapted to sealingly fix an upper end of the collar portion to the outer surface of the blade if the water intrusion prevention system is mounted on the turbine blade. With the additional head sealing means, the sealing between the upper collar and the outer surface of the turbine blade can be achieved in an easy and cheap manner. Furthermore, the head sealing means may be replaceable.

More preferably, the head sealing means comprises or consists of a tape. For example, at least approximately 50% of the tape are fixed to the outer surface of the turbine blade above the upper end of the collar portion and at least approximately 50% of the tape are fixed to the outer surface of the upper end of the upper collar such that said upper end is disposed between the tape and the outer surface of the turbine blade in a sealed manner if the water intrusion prevention system is mounted on the turbine blade. The tape may exhibit a strong binding effect and/or may be configured to be easily removed in one piece from the turbine blade without harming the turbine blade. Most preferably, the tape is waterproof.

According to still another aspect, the water intrusion prevention system preferably further comprises a tail sealing means which is adapted to sealingly fix a lower end of the collar sheet to the outer surface of the blade if the water intrusion prevention system is mounted on the turbine blade. With the additional tail sealing means, the sealing between the lower collar sheet and the outer surface of the turbine blade can be achieved in an easy and cheap manner. Furthermore, the tail sealing means may be replaceable.

More preferably, the tail sealing means comprises or consists of a tape. For example, at least approximately 50% of the tape are fixed to the outer surface of the turbine blade below the lower end of the collar sheet and at least approximately 50% of the tape are fixed to the outer surface of the lower end of the lower collar sheet such that said lower end is disposed between the tape and the outer surface of the turbine blade in a sealed manner if the water intrusion prevention system is mounted on the turbine blade. The tape may exhibit a strong binding effect and/or may be configured to be easily removed in one piece from the turbine blade without harming the turbine blade. Most preferably, the tape is waterproof.

Preferably, an inner portion of the umbrella sheet extends at least partially over the inner side of the connecting means such that said part of umbrella sheet is interposed between the connecting means and the outer surface of the turbine blade if the water intrusion prevention system is mounted on the turbine blade. This ensures reliably fixation of the umbrella sheet, especially when the system is mounted.

Additionally or alternatively, a lower portion of the collar sheet preferably extends at least partially over the inner side of the connecting means such that said lower portion is interposed between the connecting means and the outer surface of the turbine blade if the water intrusion prevention system is mounted on the turbine blade. In particular, the lower portion of the collar sheet may at least partly overlap the inner portion of the umbrella sheet. The lower portion may extend downwardly from the collar portion.

Preferably, a sealing joint is disposed between the collar sheet and the umbrella sheet at a lower end part of the collar portion. The sealing joint may be elastic and/or flexible. Apart from that, the sealing joint may be sufficiently strong.

The water intrusion prevention system according to the present invention exhibits an excellent weather protection. It can be used as extra sealing and hence as additional weather protection in combination with other habitats.

The water intrusion prevention system according to any embodiment thereof described above may be a part of a working platform and/or of a lifting device.

In addition, the present invention further relates to a method of protecting a working platform mounted on a turbine blade being in a maintenance position from rain, comprising the step of mounting a water intrusion prevention system according to any embodiment described above on the turbine blade.

The water intrusion prevention system may be mounted above the working platform.

Furthermore, the water intrusion prevention system may be mounted on the turbine blade before the working platform is mounted, after the working platform has been mounted or at the same time. For example, the water intrusion prevention system can be mounted together with the working platform.

Preferably, the method according to the present invention further comprises the step of sealing the upper end of the collar portion to the outer surface of the turbine blade by attaching the head. Most preferably, the method according to the present invention comprises the step of fixing and sealing the upper end of the collar portion to the outer surface of the turbine blade with the above-mentioned tape.

Additionally or alternatively, the method according to the present invention further comprises the step of fixing the coat sheet to the connecting means. Most preferably, the coat sheet is fixed by corresponding fastening means in the above-mentioned rail.

Finally, the present invention also relates to a system comprising a turbine blade mounted on a wind turbine, the turbine blade being in a maintenance position such that an outer tip of the turbine blade at least substantially points to the ground, wherein the water prevention system according to any one of the embodiments described above is mounted on the wind turbine blade.

Features, embodiments and advantages described above with regard to the water intrusion prevention system correspondingly apply to the method using the water intrusion prevention system and the system comprising the water intrusion prevention system.

Additional features, advantages and possible applications of the invention result from the following description of exemplary embodiments and the drawings. All the features described and/or illustrated graphically here form the subject matter of the invention, either alone or in any desired combination, regardless of how they are combined in the claims or in their references back to preceding claims.

DETAILED DESCRIPTION

A water intrusion prevention system 1 according to an embodiment of the present invention comprises a connecting means 10 a collar sheet 20 an umbrella sheet 30 and a coat sheet 40.

The water intrusion prevention system 1 is mounted on a turbine blade 100, which is part of a wind turbine and which is positioned in a maintenance position for maintenance. In this maintenance position, an outer end tip (not shown) of the turbine blade 100 points at least substantially to the ground and hence downwards. The turbine blade 100 extends from a hub of the wind turbine (not shown) downwards along a vertical direction.

As the water intrusion prevention system 1 is mounted on the turbine blade 1, a central axis 2 of the water intrusion prevention system 1 corresponds to a longitudinal axis of the turbine blade 100. Furthermore, both the central axis 2 and the longitudinal axis are at least parallel to the vertical direction which is defined by a direction of gravity.

Figure 1:
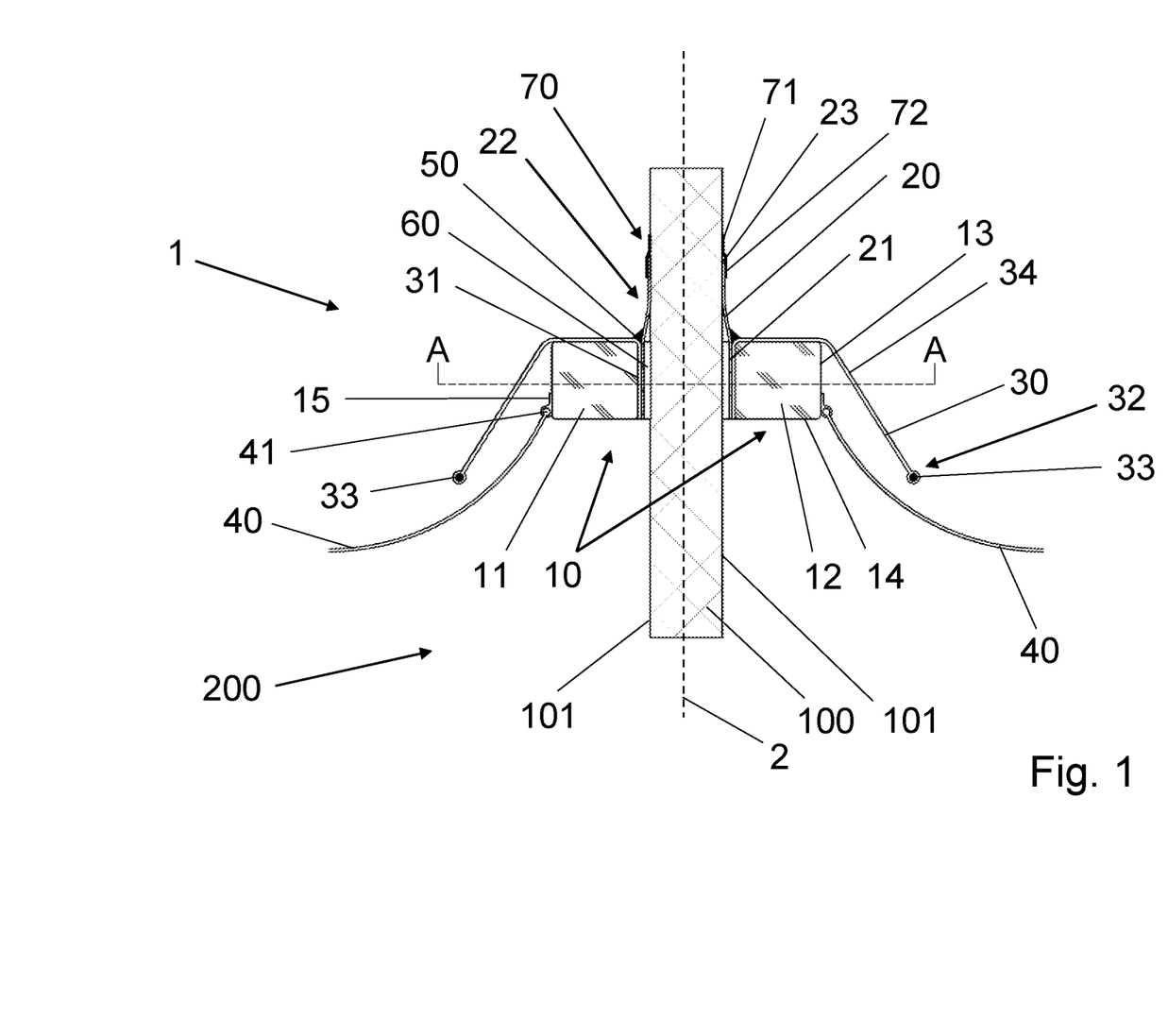
FIG. 1 is a cross-sectional view seen from the side of a water intrusion prevention system according to an embodiment of the present invention being mounted on a turbine blade of a wind turbine.
Figure 2:
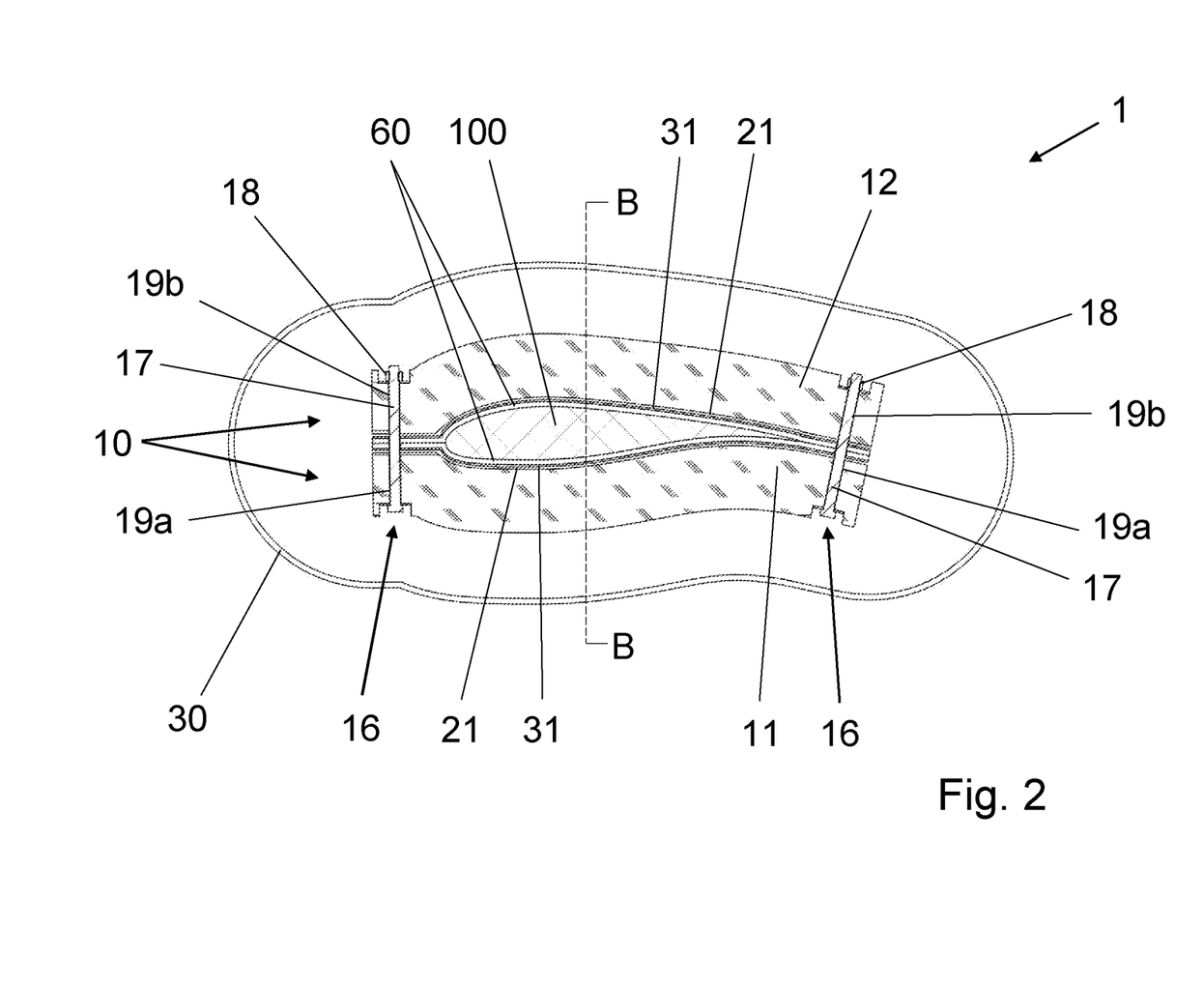
FIG. 2 is a cross-sectional view of the water intrusion prevention system of FIG. 1 at line A-A in FIG. 1 seen from the top.

As illustrated in FIG. 2, the turbine blade 100 comprises a wing-like cross-shape. FIG. 1 shows a cross-sectional view along the central axis 2 at line B-B in FIG. 2.

FIG. 1 and FIG. 2 illustrate a water intrusion prevention system 1 detachably fixed to the turbine blade 100 with the connecting means 10. In the present embodiment, the connecting means 10 comprise to wooden clamp arms 11, 12 constituting a clamping means for clamping the turbine blade 100 in-between. The two clamp arms 11, 12 are fastened together by two fastening means 16 which are provided at lateral ends (in a lateral direction perpendicular to the central axis 2) of the clamp arms 11, 12. In particular, each of the fastening means 16 comprises a bolt 17. Each bolt 17 protrudes through corresponding holes 19a, 19b in the clamp arms 11, 12, respectively. Further, each bolt 17 is engaged with a nut 18. By fastening the bolts 17 and nuts 18, the two clamp arms 11, 12 are firmly pressed onto the outer surface 101 of the turbine blade 100. By releasing the engagement between the bolts 17 and the nuts 18 the clamp arms 11, 12 are not pressed onto the outer surface 101 anymore and the water intrusion prevention system 1 can be dismounted from the turbine blade 100.

The wooden clamp arms 11, 12 are formed in a shape corresponding to a shape of the outer surface 101 of the turbine blade 100 at a mounting site where the water intrusion prevention system 1 is installed. The clamp arms 11, 12 can exhibit a certain degree of flexibility to be able to adapt to at least slightly different cross-sectional shapes of the turbine blade 100 at different mounting sites.

In general, the connecting means 10 can comprise or consist of other means for fixing the water intrusion prevention system 1 to the turbine blade 100, for example a vacuum means and/or a tie belt means (not shown).

In order to protect the turbine blade 100 from damages due to fixation of the water intrusion prevention system 1, a protections means 60 is provided between an inner side of the connecting means 10 (in particular the inner sides of the clamp arms 11, 12 in the present embodiment) and the outer surface 100. In the present embodiment, the protections means 60 consists of a single neoprene layer. The neoprene layer is flexible, elastic and exhibits good damping. Furthermore, it is waterproof and slide-blocking if at least slightly pressed against the outer surface 100.

In FIG. 1, a collar portion 22 of the collar sheet 20 forms an upper collar of the water intrusion prevention system 1. The collar portion 22 encompasses the turbine blade 100 round about in a circumferential direction perpendicular to the central axis 2.

The collar sheet 20, in particular its collar portion 22 is made of an elastic and flexible material. Hence, the collar portion 22 can easily encompass the turbine blade 100 round about in an at least substantially fittingly manner. Furthermore, the collar portion 22 can be installed easier.

An upper end 23 of the collar portion 22 is fixed to the outer surface 101 of the turbine blade 100 by means of a tape constituting a head sealing means 70.

For example, 50% of a lateral width of the tape are fixed to the outer surface 101 of the turbine blade 100 above the upper end 23 of the collar portion and 50% of the lateral width of the tape are fixed to an outer surface of the upper end 23 of the upper collar portion 22. Consequently, the upper end 23 is located between a lower half 72 of the tape and the outer surface 101 of the turbine blade 100 in a sealed manner and an upper half 71 of the tape is disposed directly on the outer surface.

In general, the tape overlaps the upper end 23 of the collar portion 22, preferably by at least 10% of its width, more preferably by at least 30% of its width and most preferably by at least 45% of its width.

Water flowing down on the outer surface 101 of the turbine blade 100 and approaching from above is guided away from the turbine blade 100 to an outside of the collar portion 22 by means of the tape. The water is prevented from passing between the collar portion 22 and the outer surface 100.

At a lower end of the collar portion 22 (and hence of the upper collar constituted thereof), the umbrella sheet 30 is adjoined to the collar sheet 20. At the junction of these elements, a sealing joint 50 is provided. The sealing joint 50 exhibits sealing between the collar portion 22 and an upper side 34 of the umbrella sheet 30. It extends around the whole turbine blade 100 in an annular manner. Preferably, it is made of a strong but flexible and elastic material. Hence, the sealing joint 50 is rugged and can adapt to different shapes of the turbine blade 100 at different mounting sites.

Apart from that, an inner portion 31 of the umbrella sheet 30 and a lower portion 21 of the collar sheet 20 extend downwards from the sealing joint 50.

The inner portion 31 directly overlaps and covers an inner side of the connecting means 10 (inner sides of the two clamp arms 11, 12). The lower portion 21 directly overlaps and covers the inner portion 31. Consequently, the lower portion 21 and the inner portion 31 are arranged between the inner side of the connecting means 10 and the protection means 60. When the connecting means 10 is fixed to the turbine blade 100 by pressing the clamp arms 11, 12 against the outer surface 100, both the inner portion 31 and the lower portion 21 are clamped in-between. This ensures tight fastening of the collar sheet 20 and the umbrella sheet 30 when the water intrusion prevention system 1 is mounted.

From the sealing joint 50, the umbrella sheet 30 extends laterally and covers an upper side of the connecting means 10. It laterally protrudes to the outside from the connecting means 10. In detail, an outer portion of the umbrella sheet 30 further extends laterally downwards to the outside. Hence, water can flow along the upper surface of the umbrella sheet 30 to the outside.

At an outer peripheral end 32 of the umbrella sheet 30, a weighting means 33 is disposed. In the present embodiment, it consists of a lead band. The weighting means 33 pulls down the outer peripheral end 32 due to its gravitational force. Hence, the weighting means 33 ensures that the outer portion of the umbrella sheet 30 extends laterally downwards when the water intrusion prevention system 1 is mounted on the turbine blade 100.

The coat sheet 40 is detachably mounted on an outer side of the clamp arms 11, 12. This reversible connection is established by rails 15 made of aluminum or an aluminum alloy, which are fixed to the outer sides of the clamp arms 11, 12, respectively. They comprise a C-like cross-sectional shape and are adapted to engage with a cable 41 disposed on an inner end of the coat sheet 40 in order to detachably mount the coat sheet. The coat sheet extends laterally downwards from the connecting means 10. It surrounds the whole turbine blade 100 in the manner of a punched disked when seen from above.

The coat sheet 40 is located below the umbrella sheet 30 and the outer portion of the umbrella sheet 30 overlaps an inner portion of the coat sheet 40. Along the lateral direction (horizontal direction), the coat sheet 40 protrudes farther away from the connecting means 10 than the outer part of the umbrella sheet by more than 100%. Water flowing down on the upper side 34 of the umbrella sheet 30 is guided to an upper side of the coat sheet 40. As the coat sheet 40 extends downwards as well, the water is further guided to the outside due to gravity.

Preferably, the peripheral outer end portion 32 of the umbrella sheet 30 may rest on the upper side of the coat sheet if the water intrusion prevention system 1 is mounted (not shown). However, in the present embodiment, the overlap of the umbrella sheet 30 and the coat sheet 40 is large enough that no water can enter the working are through a gap between the outer portion of the umbrella sheet 30 and the inner portion of the coat sheet 40.

In the main, an inclination angle (with respect to the lateral/horizontal direction) of the coat sheet 40 is substantially less than an inclination angle of the umbrella sheet 30. By this, the coat sheet 40 can cover a larger working area without impairing a clear height to a working platform below (not shown) too much. The inclination angle of the coat sheet 40, at least at an outer portion thereof, can be smaller than the one of the outer portion of the umbrella sheet 30, as the huge amount of water flowing down the turbine blade 100 above is distributed to a larger area by the umbrella sheet 30. Hence, a smaller angle of inclination of the outer portion of the coat sheet 40 is sufficient to ensure that the water is flowing off fast enough.

Obviously, due to similar reasons, an angle of inclination of the collar portion 22 is larger than the one of the umbrella sheet 30 if the water intrusion prevention system 1 is mounted.

Both a thickness and a strength of the coat sheet 40 are higher than those of the umbrella sheet 30. Furthermore, both a thickness and a strength of the umbrella sheet 30 are higher than those of the collar sheet 20.

The umbrella sheet 30 and the coat sheet 40 are made of an elastic and flexible material, respectively.

In order to facilitate the mounting and dismounting of the water intrusion prevention system 1, the collar sheet 20 and the umbrella sheet 30 (and any components thereof) may be divided into two halves (not shown) corresponding to the two clamp arms 11, 12 or more parts (not shown), respectively. The two halves/several parts can be sealingly connected to each other to form a circumferential umbrella. This may be achieved, for example, by a zipper or by hook and loop fasteners.

Moreover, an overlap of the ends of the two halves/several parts may be provided at the joint areas, respectively. This facilitates ensuring tight sealing.

As the coat sheet 40 is mounted separately via the rail 40, the coat sheet can consist of one part or of several parts, in particular of two parts. Regarding joint of the ends of the one part and the ends of the several parts, corresponding ends to be joined can sealingly connected to each other, for example by means of a zipper or hook and loop fasteners. An overlap of corresponding ends to be joined may be provided, respectively.

The water intrusion prevention system 1 protects a working area 200 below it from rain, hail and/or snow. Furthermore, the water intrusion prevention system 1 prevents water that flows down along the outer surface 100 of the turbine blade 100 from entering the working area 200. Therefore, with the water intrusion prevention system 1, the working area 200 remains dry even in a case of heavy rain.

The water intrusion prevention system 1 according to the present invention ensures tight sealing against the outer surface 101 of the turbine blade 100, it is light, and it is easy to handle.

Figure 3:
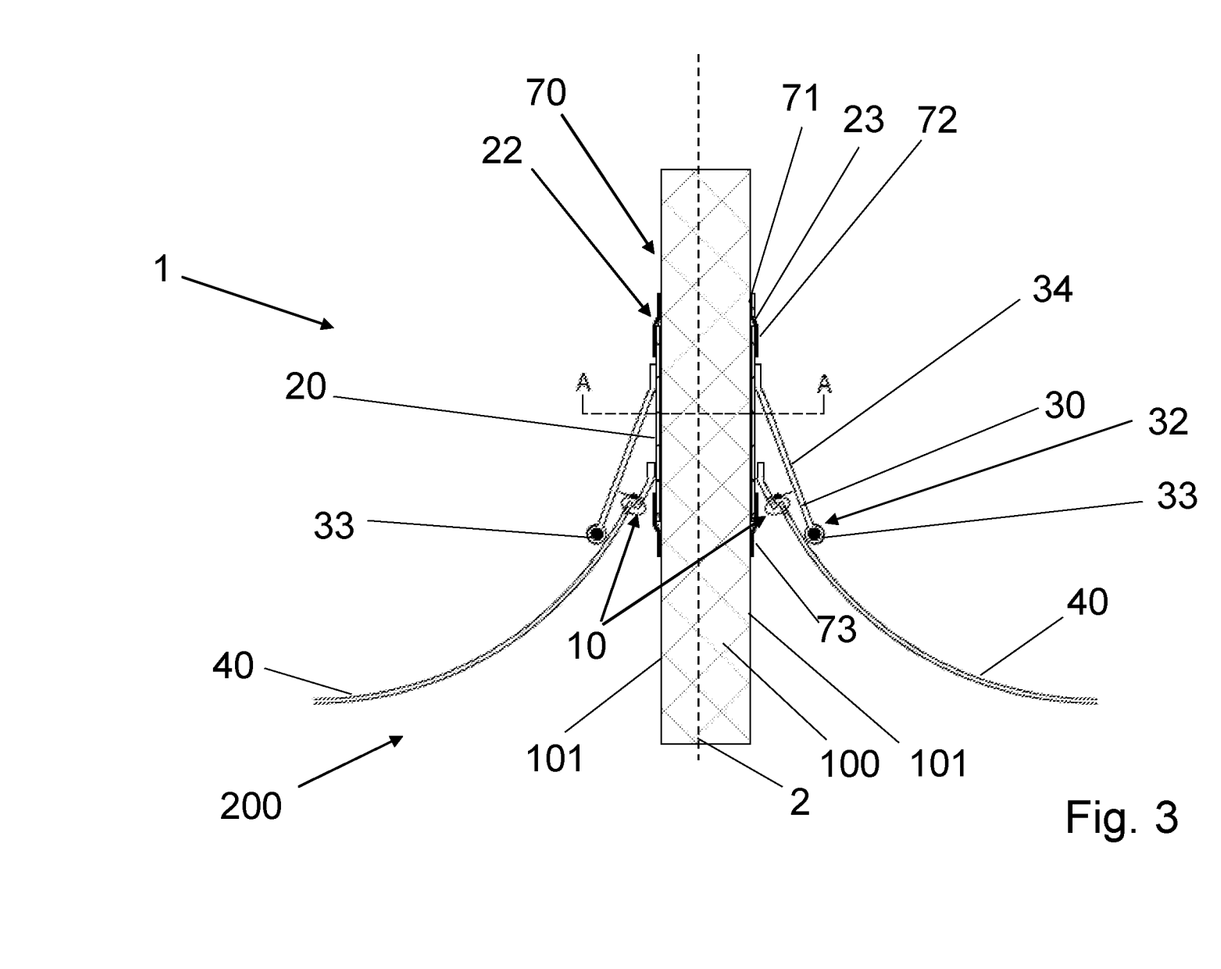
FIG. 3 is a cross-sectional view seen from the side of a water intrusion prevention system according to another embodiment of the present invention being mounted on a turbine blade of a wind turbine.
Figure 4:
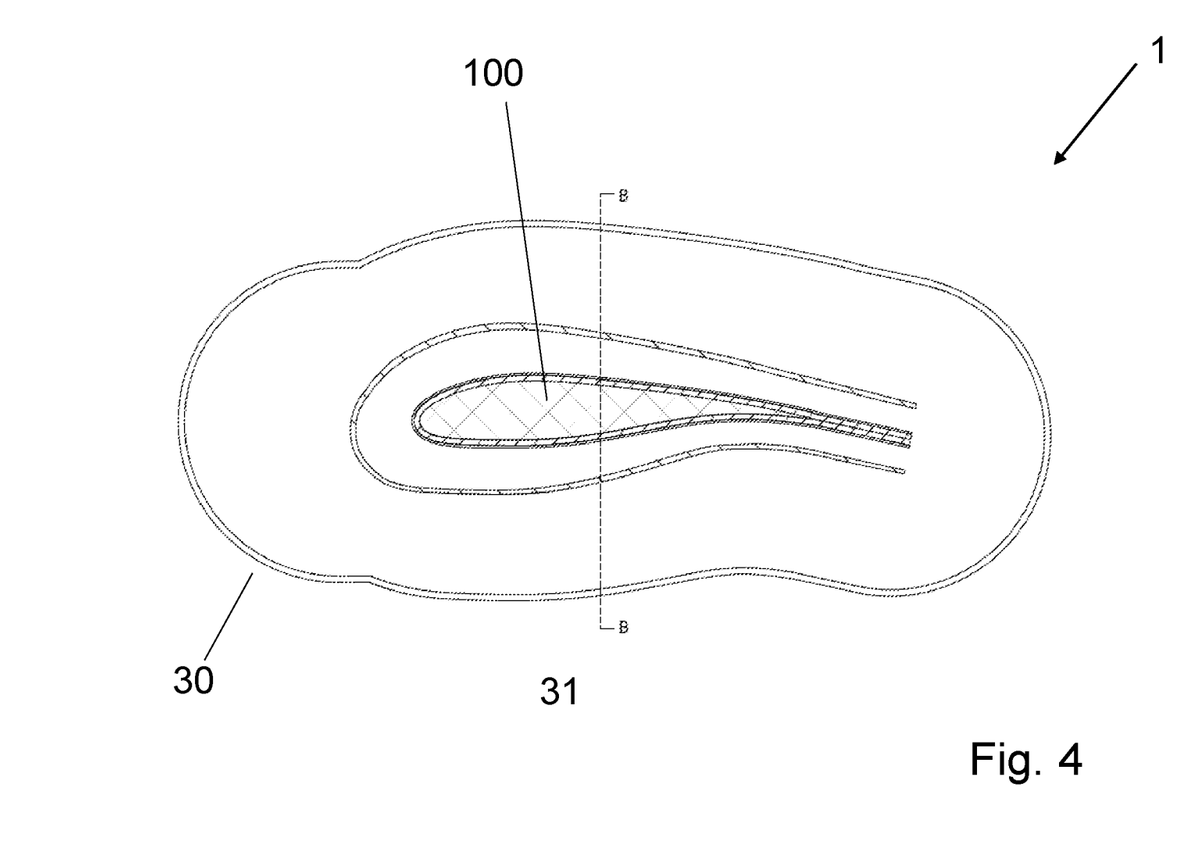
FIG. 4 is a cross-sectional view of the water intrusion prevention system of FIG. 3 at line A-A in FIG. 3 seen from the top.

FIG. 3 and FIG. 4 illustrate another embodiment of a water intrusion prevention system 1 detachably fixed to the turbine blade 100 with the connecting means 10.

In FIG. 3, a collar portion 22 of the collar sheet 20 forms an upper collar of the water intrusion prevention system 1. The collar portion 22 encompasses the turbine blade 100 round about in a circumferential direction perpendicular to the central axis 2.

The collar sheet 20, in particular its collar portion 22 is made of an elastic and flexible material. Hence, the collar portion 22 can easily encompass the turbine blade 100 round about in an at least substantially fittingly manner. Furthermore, the collar portion 22 can be installed easier.

An upper end 23 of the collar portion 22 is fixed to the outer surface 101 of the turbine blade 100 by means of a tape constituting a head sealing means 70.

For example, 50% of a lateral width of the tape are fixed to the outer surface 101 of the turbine blade 100 above the upper end 23 of the collar portion and 50% of the lateral width of the tape are fixed to an outer surface of the upper end 23 of the upper collar portion 22. Consequently, the upper end 23 is located between a lower half 72 of the tape and the outer surface 101 of the turbine blade 100 in a sealed manner and an upper half 71 of the tape is disposed directly on the outer surface.

In general, the tape overlaps the upper end 23 of the collar portion 22, preferably by at least 10% of its width, more preferably by at least 30% of its width and most preferably by at least 45% of its width.

Water flowing down on the outer surface 101 of the turbine blade 100 and approaching from above is guided away from the turbine blade 100 to an outside of the collar portion 22 by means of the tape. The water is prevented from passing between the collar portion 22 and the outer surface 100.

An umbrella sheet 30 is adjoined to the collar sheet 20. At the junction of these elements, a sealing joint may be provided (not disclosed at the drawing). The sealing joint exhibits sealing between the collar portion 22 and an upper side 34 of the umbrella sheet 30. It extends around the whole turbine blade 100 in an annular manner. Preferably, it is made of a strong but flexible and elastic material. Hence, the sealing joint is rugged and can adapt to different shapes of the turbine blade 100 at different mounting sites.

A lower end of the collar sheet is fixed to the outer surface 101 of the turbine blade 100 by means of a tape constituting a tail sealing means 73 this tail sealing means is adapted to fix a lower end of the collar sheet to the outer surface of the blade if the water intrusion prevention system is mounted on the turbine blade. With the additional tail sealing means, the sealing between the lower end of the collar sheet and the outer surface of the turbine blade can be achieved in an easy and cheap manner. Furthermore, the tail sealing means 73 may be replaceable.

The tail sealing means comprises or consists of a tape. For example, at least approximately 50% of the tape are fixed to the outer surface of the turbine blade 101 below the lower end of the collar sheet and at least approximately 50% of the tape are fixed to the outer surface of the lower end of the lower collar sheet such that said lower end is disposed between the tape and the outer surface of the turbine blade in a sealed manner if the water intrusion prevention system is mounted on the turbine blade. The tape may exhibit a strong binding effect and/or may be configured to be easily removed in one piece from the turbine blade without harming the turbine blade. Most preferably, the tape is waterproof.

The umbrella sheet 30 protect the connecting means 10 from water. Hence, water can flow along the upper surface of the umbrella sheet 30 to the outside.

At an outer peripheral end 32 of the umbrella sheet 30, a weighting means 33 is disposed. In the present embodiment, it consists of a lead band. The weighting means 33 pulls down the outer peripheral end 32 due to its gravitational force. Hence, the weighting means 33 ensures that the outer portion of the umbrella sheet 30 extends laterally downwards when the water intrusion prevention system 1 is mounted on the turbine blade 100.

The coat sheet 40 is detachably mounted on the connecting means 10, with fixing means. The fixing means is at the drawing disclosed as a lashing/tieing where holes in respectively the connecting means 10 and the coat sheet 40 are connected with strips. The coat sheet 40 could also be detachable mounted on the connecting means with other fixing means like shoe band, zipper, hook and loop fastener of any other easy fastener. The coat sheet 40 extends laterally downwards from the connecting means 10. It surrounds the whole turbine blade 100.

The coat sheet 40 is located below the umbrella sheet 30 and the outer portion of the umbrella sheet 30 overlaps an inner portion of the coat sheet 40. Along the lateral direction (horizontal direction), the coat sheet 40 protrudes farther away from the connecting means 10 than the outer part of the umbrella sheet by more than 100%. Water flowing down on the upper side 34 of the umbrella sheet 30 is guided to an upper side of the coat sheet 40. As the coat sheet 40 extends downwards as well, the water is further guided to the outside due to gravity.

In FIG. 3, the peripheral outer end portion 32 of the umbrella sheet 30 rest on the upper side of the coat sheet 40.

The coat sheet 40 can cover a large working area without impairing a clear height to a working platform below (not shown). The inclination angle of the coat sheet 40, at least at an outer portion thereof, can be smaller than the one of the outer portion of the umbrella sheet 30, as the huge amount of water flowing down the turbine blade 100 above is distributed to a larger area by the umbrella sheet 30. Hence, a smaller angle of inclination of the outer portion of the coat sheet 40 is sufficient to ensure that the water is flowing off fast enough.

Obviously, due to similar reasons, an angle of inclination of the collar portion 22 is larger than the one of the umbrella sheet 30 if the water intrusion prevention system 1 is mounted.

The umbrella sheet 30 and the coat sheet 40 are made of an elastic and flexible material, respectively.

In order to facilitate the mounting and dismounting of the water intrusion prevention system 1, the collar sheet 20 and the umbrella sheet 30, and any components thereof, may be divided into two or more parts (not shown). The two or more parts can sealingly be connected to each other to form a circumferential umbrella. This may be achieved, for example with a simple overlapping, by a zipper or by hook and loop fasteners.

As the coat sheet 40 is mounted separately via the fixing means, the coat sheet can consist of one part or of several parts, in particular of two parts. Regarding the joint of the ends of the one part and the ends of the several parts, can sealingly be connected to each other to form a circumferential coat. This may be achieved, for example with a simple overlapping, by a zipper or by hook and loop fasteners.

The water intrusion prevention system 1 protects a working area 200 below it from rain, hail and/or snow. Furthermore, the water intrusion prevention system 1 prevents water that flows down along the outer surface 100 of the turbine blade 100 from entering the working area 200. Therefore, with the water intrusion prevention system 1, the working area 200 remains dry even in a case of heavy rain.

The water intrusion prevention system 1 according to the present invention ensures tight sealing against the outer surface 101 of the turbine blade 100, it is light, and it is easy to handle.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A water intrusion prevention system for mounting on a turbine blade being in a maintenance position in which a longitudinal axis of the turbine blade is oriented in a vertical direction which is defined by a direction of gravity,
    wherein a central axis of the water intrusion prevention system is at least substantially parallel to the longitudinal axis of the turbine blade when the water intrusion prevention system is mounted on the turbine blade,
    the water intrusion prevention system comprising:
    a connecting means adapted for removably fixing the water intrusion prevention system on the turbine blade;
    a collar sheet disposed on the connecting means and having a collar portion protruding away from the connecting means at least substantially parallel to the central axis such that the collar portion constitutes an upper collar surrounding the turbine blade round about and sealing round about against an outer surface of the turbine blade when the water prevention system is mounted on the turbine blade, the collar portion constituting an upper end part of the water intrusion prevention system along the central axis;
    an umbrella sheet disposed over the connecting means, the umbrella sheet covering an upper side of the connecting means and protruding laterally downwards away from the connecting means round about the turbine blade when the water prevention system is mounted on the turbine blade;
wherein the umbrella sheet sealingly adjoins the collar portion.

2. The water intrusion prevention system according to claim 1, further comprising a coat sheet disposed on the connecting means, the coat sheet protruding laterally away from the connecting means below the umbrella sheet such that the coat sheet extends round about the turbine blade and that the umbrella sheet partly overlaps the coat sheet when the water prevention system is mounted on the turbine blade.

3. The water intrusion prevention system according to claim 2, wherein a fixing means is provided on the connecting means for attaching the coat sheet to the connecting means.

4. The water intrusion prevention system according to claim 2, wherein the coat sheet is removably fixed to the connecting means.

5. The water intrusion prevention system according to claim 1, wherein a weighting means is disposed at an outer peripheral end of the umbrella sheet for forcing down said end region when the water intrusion prevention system is mounted on the turbine blade.

6. The water intrusion prevention system according to claim 1, wherein the connecting means is a clamp means comprising two clamp arms, the clamp arms being adapted to be mounted at both sides of the turbine blade for clamping the turbine blade in-between.

7. The water intrusion prevention system according to claim 6, wherein the two clamp arms are adapted to be fastened together for clamping the turbine blade in-between by means of at least two fastening means.

8. The water intrusion prevention system according to claim 1, wherein the water intrusion prevention system further comprises a protection means which is located between an inner side of the connecting means and the outer surface of the turbine blade when the water intrusion prevention system is mounted on the turbine blade.

9. The water intrusion prevention system according to claim 1, wherein the water intrusion prevention system further comprises a head sealing means which is adapted to sealingly fix an upper end of the collar portion to the outer surface of the blade when the water intrusion prevention system is mounted on the turbine blade.

10. The water intrusion prevention system according to claim 1, wherein the water intrusion prevention system further comprises a tail sealing means which is adapted to sealingly fix a lower end of the collar sheet to the outer surface of the blade when the water intrusion prevention system is mounted on the turbine blade.

11. The water intrusion prevention system according to claim 9, wherein the head and or the tail sealing means comprises tape.

12. The water intrusion prevention system according to claim 1, wherein an inner portion of the umbrella sheet extends at least partially over the inner side of the connecting means such that said part of umbrella sheet is interposed between the connecting means and the outer surface of the turbine blade when the water intrusion prevention system is mounted on the turbine blade.

13. The water intrusion prevention system according to claim 1, wherein a lower portion of the collar sheet extends at least partially over the inner side of the connecting means such that said lower portion is interposed between the connecting means and the outer surface of the turbine blade when the water intrusion prevention system is mounted on the turbine blade.

14. The water intrusion prevention system according to claim 1, wherein a sealing joint is disposed between the collar sheet and the umbrella sheet at a lower end part of the collar portion.

15. A method of protecting a working platform mounted on a turbine blade being in a maintenance position from rain, comprising the step of mounting a water intrusion prevention system according to claim 1 on the turbine blade.

16. The water intrusion prevention system according to claim 3, wherein the coat sheet is removably fixed to the connecting means.

17. The water intrusion prevention system according to claim 2, wherein a weighting means is disposed at an outer peripheral end of the umbrella sheet for forcing down said end region when the water intrusion prevention system is mounted on the turbine blade.

18. The water intrusion prevention system according to claim 3, wherein a weighting means is disposed at an outer peripheral end of the umbrella sheet for forcing down said end region when the water intrusion prevention system is mounted on the turbine blade.

19. The water intrusion prevention system according to claim 4, wherein a weighting means is disposed at an outer peripheral end of the umbrella sheet for forcing down said end region when the water intrusion prevention system is mounted on the turbine blade.

20. The water intrusion prevention system according to claim 2, wherein the connecting means is a clamp means comprising two clamp arms, the clamp arms being adapted to be mounted at both sides of the turbine blade for clamping the turbine blade in-between.

* * * * *

UNITED STATES PATENT AND TRADEMARK OFFICE
CERTIFICATE OF CORRECTION

| | | |
|---|---|---|
| PATENT NO. | : 11,525,435 B2 | Page 1 of 1 |
| APPLICATION NO. | : 17/274593 | |
| DATED | : December 13, 2022 | |
| INVENTOR(S) | : Jesper Ankjær Pedersen et al. | |

It is certified that error appears in the above-identified patent and that said Letters Patent is hereby corrected as shown below:

On the Title Page

Insert:
-- (30) Foreign Priority Application Data
Sep. 17, 2018 (DK) ................................................ PA201800586 --

Signed and Sealed this
Twenty-sixth Day of March, 2024

*Katherine Kelly Vidal*

Katherine Kelly Vidal
*Director of the United States Patent and Trademark Office*